(No Model.)
J. C. TRULLINGER.
INSERTIBLE SAW TOOTH.
No. 311,692. Patented Feb. 3, 1885.
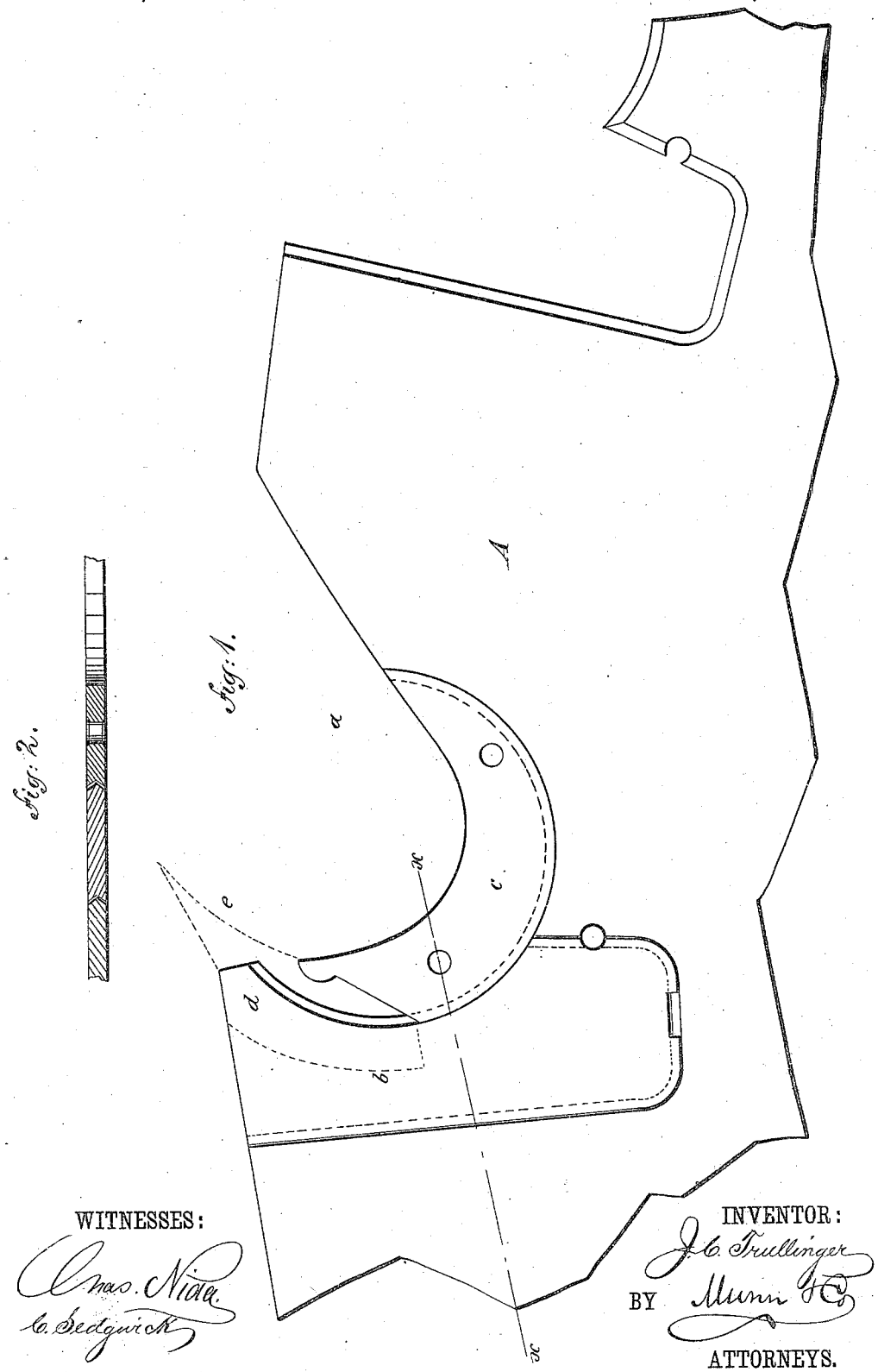
WITNESSES:
Chas. Nida
C. Sedgwick
INVENTOR:
J. C. Trullinger
BY Munn & Co
ATTORNEYS.

UNITED STATES PATENT OFFICE.

JOHN CORSE TRULLINGER, OF ASTORIA, OREGON.

INSERTIBLE SAW-TOOTH.

SPECIFICATION forming part of Letters Patent No. 311,692, dated February 3, 1885.

Application filed June 6, 1884. (No model.)

*To all whom it may concern:*

Be it known that I, JOHN C. TRULLINGER, of Astoria, county of Clatsop, Oregon, have invented a new and useful Improvement in Saws, of which the following is a full, clear, and exact description.

My improvements relate to saws having removable teeth or bits, the object being to prevent breakage and wear of the saw-plate, and to obtain ample clearance. These objects have to some extent been partially obtained; but in no case that I am aware of are they both fully attained at once, as by my new combination of parts, hereinafter described and claimed.

Reference is to be had to the accompanying drawings, forming part of this specification, in which similar letters of reference indicate corresponding parts in both figures.

Figure 1 is a face view of a portion of a saw of my improved construction; and Fig. 2 is a section on line $xx$, Fig. 1.

The saw-plate A is formed with a deep throat, $a$, at each tooth. Back of the throat $a$ is a patch or shank, $b$, inserted in a suitable recess, and having its forward edge curved to conform to the curved recess at the bottom of throat $a$, that receives the clamping-bit $c$. The shank $b$ is case-hardened at the point or portion $d$ (marked by dotted lines) that sustains the pressure of the tooth $e$, so that in case of the tooth running against a spike or other hard substance the portion $d$ breaks off, leaving the saw-plate unharmed. This hardening also saves wear that would loosen the tooth and allow it to fly out. Any suitable device may be used for retaining the shank and bit in place. The clamping or rotary bit $c$ fits in the curved recess at the bottom of the throat, leaving ample clearance for dust, so that the feed that can be used without the saw choking or heating is almost unlimited. By this combination of parts with the deep-throated saw the advantages of this class of saws are largely increased, as I attain at once the valuable features that are found separately in the different devices now used.

I am aware that is not new to use a wearing patch or shank in a saw, and that a rotary bit or shank has been used. Such I do not claim *per se;* but,

Having thus described my invention, I claim as new and desire to secure by Letters Patent—

1. In a saw of that class having a rotary clamping-bit seated in a recess at the bottom of the throat in front of each tooth, the removable tooth back or shank, having a case-hardened portion at the back of the inserted portion of the tooth, substantially as and for the purpose set forth.

2. In a saw, the combination, with the blade, of the rotary clamping-bit seated in a curved recess at the bottom of the throat in front of each tooth, and the removable tooth shank or back curved at its front side to conform to the curvature of said recess or seat, together with the tooth, with its lower portion interposed or held between said shank and bit, substantially as and for the purpose set forth.

3. In a saw, the combination, with the blade or plate, of the rotary clamping-bit seated in a curved recess at the bottom of the throat in front of each tooth, and the removable shank or back curved to conform to the curvature of the aforesaid recess, and having a case-hardened portion along its upper curved surface, together with the tooth, with its lower portion held or interposed between the case-hardened portion of the removable shank or back and said bit, substantially as and for the purpose set forth.

JOHN CORSE TRULLINGER.

Witnesses:
F. D. WINTON,
JOHN JOHNSON.